United States Patent Office 3,477,456
Patented Nov. 11, 1969

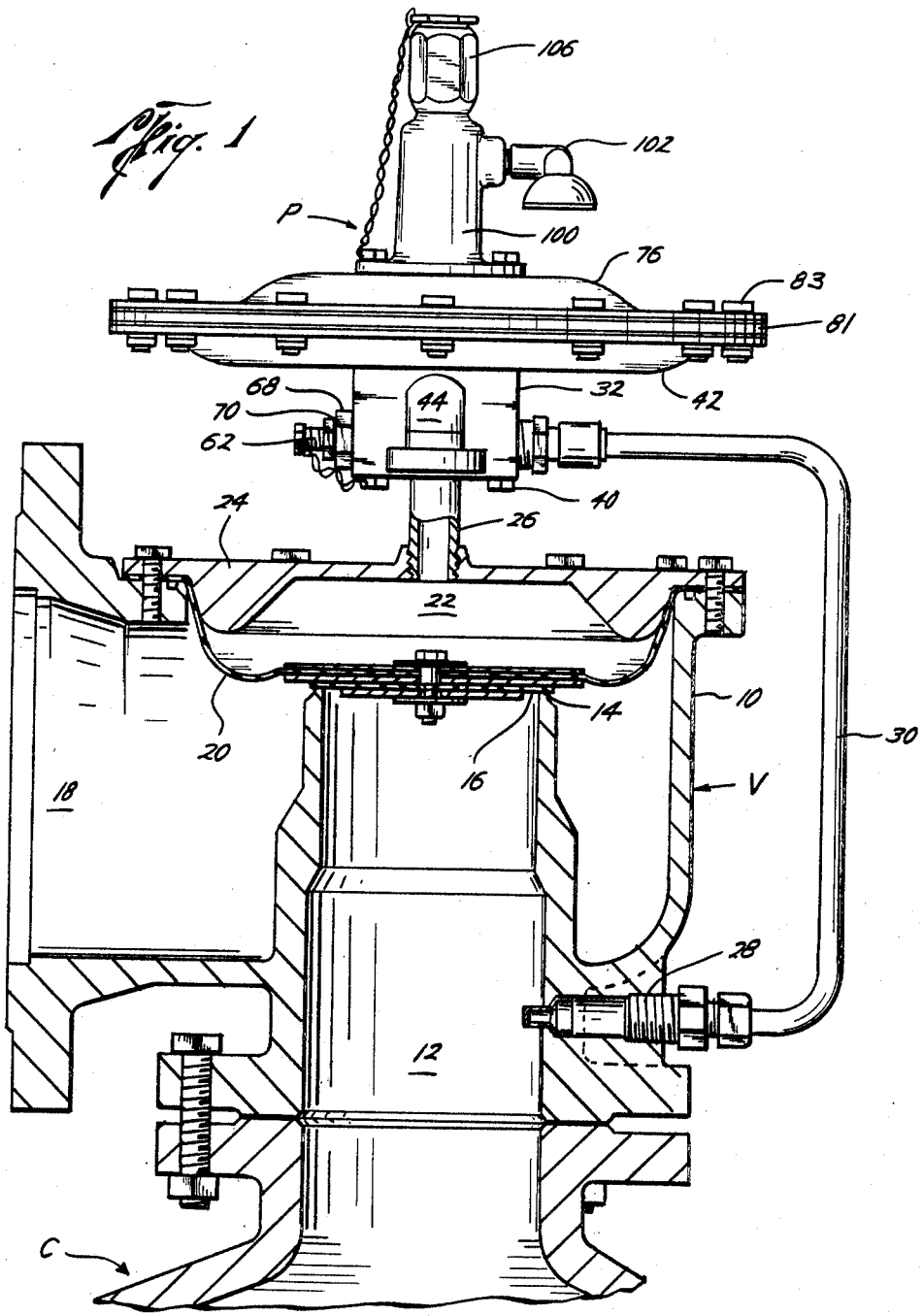

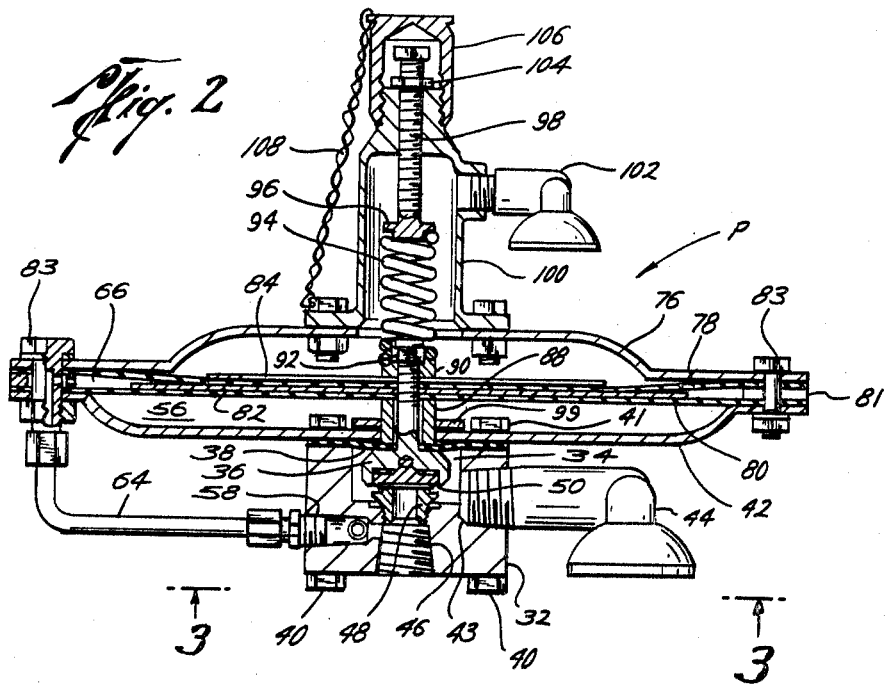
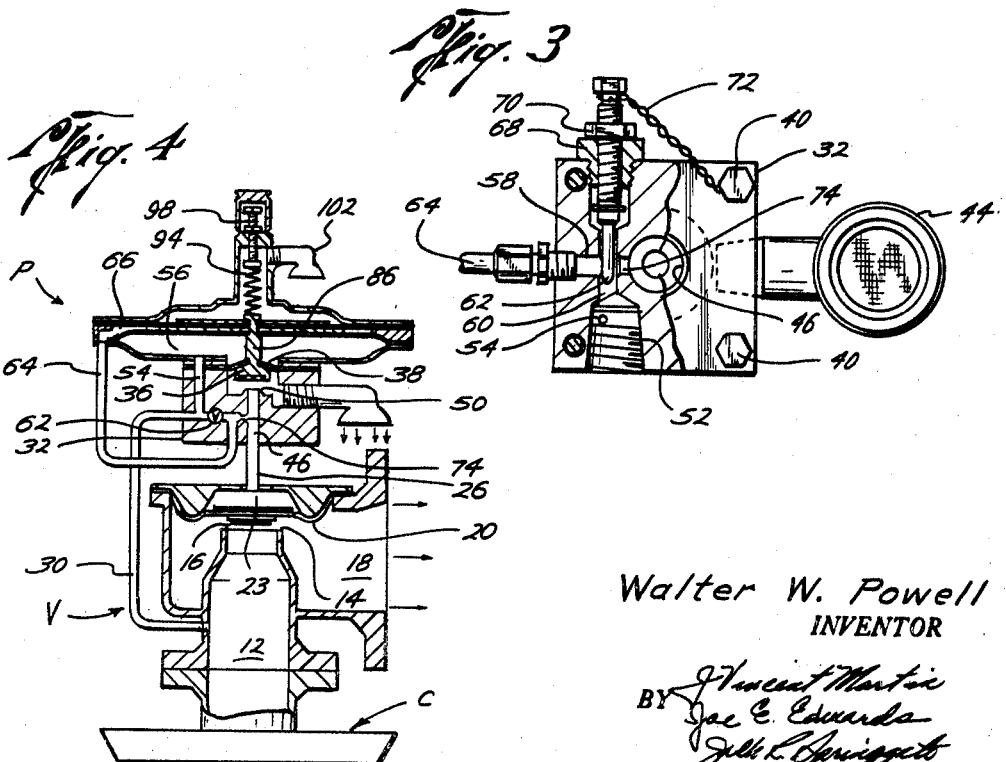
Walter W. Powell
INVENTOR

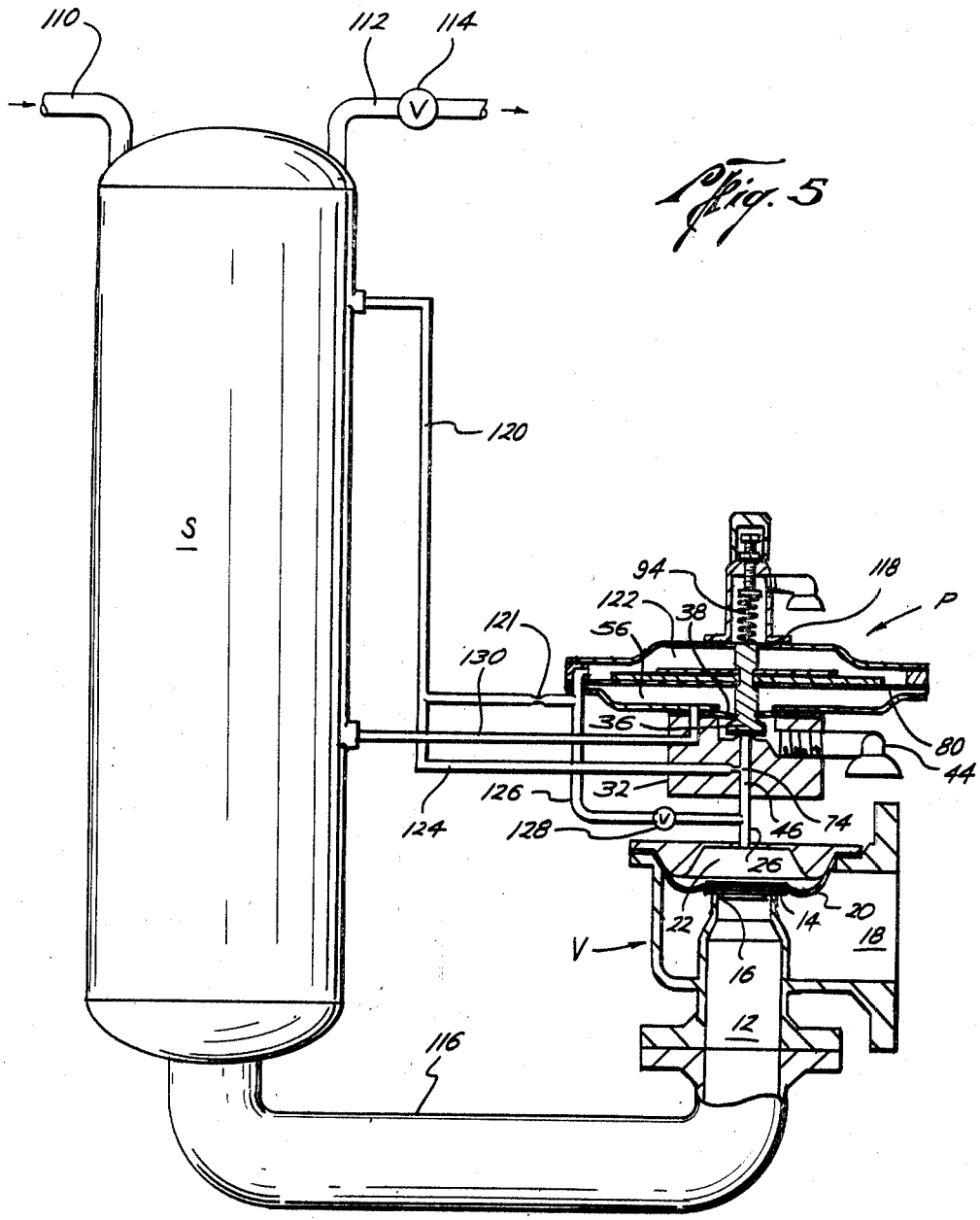

3,477,456
VALVE
Walter W. Powell, Houston, Tex., assignor to Anderson, Greenwood & Co., Bellaire, Tex., a corporation of Texas
Filed Apr. 3, 1967, Ser. No. 627,917
Int. Cl. F16t *1/14;* F04f *1/18;* F16k *31/18*
U.S. Cl. 137—171
12 Claims

ABSTRACT OF THE DISCLOSURE

A pressure responsive pilot controlled valve adapted to control pressure conditions with a variable restriction in the actuating fluid lines to vary the control signal to the pilot for controlling the main valve in a predetermined manner and the pilot valve therefor.

BACKGROUND OF THE INVENTION

In the control of fluid pressure conditions in a vessel or pipe (hereinafter referred to as pressure fluid container) it is desirable to control the operation of the main valve so that it responds to the fluid pressure it is controlling in a predetermined manner. For example, when the valve is used to protect the fluid pressure container from excess fluid pressure by venting fluids through the valve, it is sometimes desired to control the amount of blowdown, i.e., the amount of the pressure reduction in the container when the valve opens. In other applications, such as a liquid discharge valve for controlling the liquid level in a container, it is often desirable to have the valve remain partly open or proportioning to maintain a predetermined liquid level in the container or it may be desired that the valve controlling liquid discharge opens when the liquid level reaches a high point and closes when the liquid level reaches a low point in the container. It is important to remember that in providing such proportional control, the main valve design must be capable of maintaining the proportional position responsive to the pressure of the actuating fluid pressure maintained by the pilot valve.

Prior pilot controlled valves capable of maintaining such desired control have had various disadvantages, such as, continuous bleeding of fluid through the pilot, requiring a separate source of supply gas, conducting actuating pressure to the main valve actuator without providing a variable control therefor and generally have been of expensive non-rugged construction.

It is therefore an object of the present invention to provide an improved pilot controlled valve for control of fluid pressures including an adjustment for changing the response of the valve to snap action or proportional action.

Another object is to provide an improved pilot control system for a main valve in which the control signal to the pilot is varied to control the operation of the main valve.

Another object is to provide an improved pilot controlled pressure relief valve with effective blowdown control.

A further object is to provide an improved pilot controlled liquid level control valve which may be adjusted to maintain the liquid level in a container to which the valve is connected at a predetermined level or between two predetermined levels in such container.

A further object is to provide an improved pilot controlled valve having accurate responses which is of simple rugged construction and which includes fail-safe features.

Still another object is to provide an improved pressure responsive pilot controlled valve which has universal application to controlling pressure in pressure fluid containers.

A still further object is to provide an improved pressure responsive pilot valve having suitable control to vary the operating response of the pilot valve.

These and other objects and advantages of the present invention are hereinafter described with reference to the preferred forms of the invention shown in the drawings and wherein:

FIGURE 1 is an elevation view of the pilot controlled valve of the present invention and shows the main valve in section.

FIGURE 2 is a detailed sectional view of the pilot valve of the present invention.

FIGURE 3 is a bottom view of the body of the pilot valve with portions thereof broken away to illustrate the interior construction.

FIGURE 4 is a schematic view of a pilot controlled pressure relief valve constructed in accordance with the present invention and illustrates the valve in relieving position.

FIGURE 5 is a schematic view of a pilot controlled liquid level control valve constructed in accordance with the present invention to illustrate its control of the liquid level in the container shown.

DESCRIPTION OF THE PREFERRED EMBODIMENT

As shown in FIGURE 1, the main valve V includes the pilot P and is adapted to be connected to the pressure fluid container C so that the inlet 12 defined by the main valve body 10 is in communication with the interior of the pressure fluid container C. The valve seat 14 surrounds the interior extension of the inlet 12 and is adapted to receive the valve element 16 to close communication between the inlet 12 and the outlet 18 defined by the valve body 10. The valve element 16 is controlled by suitable pressure responsive means such as, the diaphragm 20 which responds to the pressures contained in the chamber 22 defined between the diaphragm 20 and the cover plate 24, which is suitably secured to the valve body 10. Connection between the pilot P and the valve chamber 22 is provided by the nipple 26 which threadedly engages into the cover plate 24 and communicates with the pilot as hereinafter described. A suitable fitting 28 which is adapted for picking up total pressure, is connected into the body 10 and has its inner end in communication within the inlet 12 as shown. A line 30 extends from the fitting 28 to the pilot body 32 to provide a communication for conducting total fluid pressure from the inlet 12 to the pilot P. The pilot P is so constructed as hereinafter explained in detail, to control the action of the main valve element 16 in response to the pressure fluid within the container C whereby the main valve element will open and close to control the fluid pressure within the container C as desired.

The pilot body defines the chamber 34 in which the valve 36 is positioned supported by the diaphragm 38 which is secured to the upper portion of the body 32 by the bolts 40 and the nuts 41 and they also secure the lower diaphragm case 42 to the upper portion of the pilot body 32. The body 32 also defines the outlet 43 from chamber 34. Exhaust fitting 44 connects into outlet 43. The body 32 provides a threaded opening or port 46 adapted to receive the nipple 26 to provide communication from the valve chamber 22 to the pilot P. The nozzle 48 is secured in the body 32 and defines the valve seat 50 which cooperates with the valve 36 to control the communication between the valve chamber 22 and the pilot chamber 34. Thus, whenever valve 36 is unseated, the pressure in the valve chamber 22 is exhausted through the nipple 26, the nozzle 48 and out the outlet 43 and exhaust fitting 44.

To supply the pilot with pressure for both sensing the pressure conditions and to provide actuating fluid to the valve chamber 22, the pilot body 32 defines the inlet 52 which is adapted to connect to the line 30. The bore 54 extends from the inlet 52 through the body 32 through the lower diaphragm case 42 to provide communication to the diaphragm sensing chamber 56 as hereinafter defined. Communication is provided between the inlet 52 and the port 58 by the passage 60 which cooperates with the adjustable needle 62 to provide a variable restriction for the fluids flowing through the passage 60. The port 58 communicates through the line 64 to the boost chamber 66 as hereinafter explained. The adjustable needle 62 is threaded into the fitting 68, which is connected into the body 32 and is adapted by rotation to move inwardly and outwardly to vary the flow area available through the passage 60. Suitable lock nut 70 is provided to lock and seal the needle in position once it is properly set. Further, the lock wire 72 is secured both to the outer end of the needle 62 and to the head of one of the bolts 40 to assure that the setting of the adjustable needle is maintained. The orifice 74 provides communication between the port 58 and the threaded opening 46.

The pressure responsive means for the pilot P includes the lower diaphragm case 42, the upper diaphragm case 76, the upper diaphragm 78, the lower diaphragm 80 whose outer peripheries are secured together with the spacer ring 81 therebetween by the fasteners 83 which also secure the upper diaphragm case 76 to the lower diaphragm case 42. The diaphragm sensing chamber 56 is that space between the lower diaphragm case 42 and the lower diaphragm 80. The large diaphragm reinforcing plate 82 is secured between the upper and lower diaphragms 78 and 80 and the diaphragm plate 84 is secured above the upper diaphragm 78. The two diaphragms 78 and 80 and the two diaphragm plates 82 and 84 are secured as shown to the valve stem 86 with the spacer ring 88 secured between the lower portion of the lower diaphragm 80 and the upper portion of the diaphragm 38. The spring washer 90 centers the spring and is retained by the lock nut 92. The spring 94 extends upwardly from the spring washer 90 into engagement with the upper spring seat 96 on the adjustable screw 98. Check plate 99 surrounds the ring 88 and is slidable thereon so that it will seat on the upper surface of case 42 as hereinafter explained. The bonnet 100 is suitably secured to the upper diaphragm case 76 and is provided with the exhaust fitting 102 to vent the space within the bonnet 100 and the space between the upper diaphragm 78 and the upper diaphragm case 76. The adjustable screw 98 threadably engages through the upper end of the bonnet 100 to provide for adjusting the force exerted by the spring 94 and includes the lock nut 104. The cap 106 is secured to the upper end of the bonnet 100 to protect the adjustable screw 98 and is suitably lock wired when properly set by the lock wire 108 to one of the bolts securing the bonnet 100 to the upper diaphragm case 76.

The operation of the pilot and valve to control the pressure of fluids within the container C is best seen in FIGURE 4. Pressure fluid from the inlet 12 is conducted through the line 30 and the bore 54 directly into the sensing chamber 56. This fluid also is conducted through the variable restriction of bore 60 and adjustable needle 62 through the line 64 to the boost chamber 66 and further is conducted through the orifice 74, the threaded opening 46, the nipple 26 into the valve chamber 22. The adjusting screw 98 is set to cause the spring 94 to apply a predetermined force to the upper end of valve stem 86. It should be noted that the effective pressure area of diaphragm 78 is smaller than the effective pressure area of the diaphragm 80. Thus, when the pressure of the fluids within the container C is below the predetermined desired level, the force created by the spring 94 and the force created by the pressure in the boost chamber 66 will be sufficient to overcome the force due to the pressure within the sensing chamber 56 on the underside of diaphragm 80. In this condition, the valve 36 will remain in engagement with the seat 50 and sufficient pressure will be maintained within the chamber 22 to hold the valve 16 on the seat 14. However, when the pressure within the container C increases, this increase in pressure is transmitted through the inlet 12, the line 30 directly into the sensing chamber 56 and such pressure will create forces sufficient to overcome the downward forces on the diaphragm thus lifting the valve 36 slightly from the seat 50 to vent fluid out from the chamber 22 through the exhaust fitting 44 and also to vent from the boost chamber 66 through the orifice 74. The venting of the boost chamber 66 decreases the downward force on the diaphragm assembly and therefore causes the assembly to lift the valve 36 higher off the seat 50 to assure complete venting of the chamber 22 causing the valve 16 to move to its full open position and thereby venting fluids from the container C through the inlet 12, the seat 14 and out the outlet 18. While not shown, it may be desirable in some instances to provide the suitable line connection to the outlet 18 to conduct the vented fluids to a suitable disposal storage area.

From this it can be seen that the adjustment of the adjustable restriction which adjustment is provided by the adjustable needle 62 will control the relative pressures in the chambers 56 and 66. With little or no restriction provided by this adjustable restriction, the pressure in the chambers will remain substantially the same thereby decreasing the net lifting force of the pressure responsive means against the spring 94. Also, by varying this adjustment to provide a maximum pressure drop, it can be seen that the net lifting force will be increased as soon as there is flow in the lines allowing the boost chamber 66 to be substantially reduced in pressure with respect to the diaphragm sensing chamber 56.

When the pressure of the fluids within container C falls to a predetermined level, this pressure of course, is transmitted through the line 30 and the bore 54 to the sensing chamber 66. As soon as the valve 36 commences to restrict flow, the pressure in the boost chamber 66 builds to a pressure approaching the pressure in the sensing chamber 56 thereby providing additional downward force on the assembly closing the valve 36 completely. With this valve 36 closed, pressure fluid flows through the orifice 74 to the chamber 22 and causes the valve 16 to engage the seat 14 shutting flow off through the valve V. The valve V remains closed until such time as the pressure within the container C actuates the pilot P to exhaust pressure from the chamber 22.

This same pilot control valve with slight modification, as hereinafter explained, can be used to control the liquid level within a container. Such application is schematically illustrated in FIGURE 5 wherein the separator S is provided with an inlet 110, a gas outlet 112 controlled by a back pressure regulator 114, and a liquid outlet 116 controlled by the valve V. As shown in FIGURE 5, the liquid outlet 116 is connected to communicate with the inlet 12 of the valve V whereby the valve 16 controls discharge of liquid from the separator S. It should be noted that the upper diaphragm 78 has been omitted from the structure of the pressure responsive means controlling the valve 36 and a diaphragm 118 substituted therefor to isolate the upper chamber within upper diaphragm casing 76 from the chamber defined thereabove by the bonnet 100. This diaphragm 118 has the same effective pressure area as the diaphragm 38.

Static pressure is conducted from the upper gas filled portion of the separator S through the line 120 and fixed orifice 121 to the upper diaphragm chamber 122 which gas urges diaphragm 80 in a direction to seat valve 36.

Actuating gas is conducted through the line 124 from line 120 through the orifice 74 into the threaded opening 46 and the main valve diaphragm chamber 22. Bypass line 126, including the adjustable needle valve 128, connects from the line 26 and extends into connection with line 120 downstream of orifice 121 to communicate with the upper diaphragm chamber 122. The liquid pressure in the separator S is conducted through the line 130, through the body 32 of the pilot P into the lower diaphragm sensing chamber 56 to urge diaphragm 80 in a direction to unseat valve 36. From this it can be seen that the differential pressure across the diaphragm 80 is responsive only to the head of liquid in the separator S above the level of diaphragm 80 and the force of spring 94. The force exerted by the spring 94 is preset to determine the level of liquid above the level of diaphragm 80 which is necessary to open the pilot valve 36. With the bypass valve 128 closed, the main valve 16 opens an amount necessary to discharge sufficient liquid from separator S to maintain a constant level therein. A higher level of liquid in separator S is maintained when discharge flow rates are higher. The bypass valve 128 may be opened slightly to increase sensitivity that is, to decrease the additional head necessary to move the main valve to full open position. Further, opening of bypass valve 128 continues to decrease the additional head necessary to fully open the main valve 16 until the point is reached where a slight opening of the pilot valve 36 exhausts the chamber 122 and allows pilot valve 36 to open fully thereby venting chamber 22 so that the main valve opens fully. In this condition, the level of liquids in the separator S decreases to the point at which the force of spring 94 overcomes the force of the liquid head in diaphragm chamber 56 causing pilot valve 36 to close and main valve 16 to close. As the bypass valve 128 is opened further this bleeding of chamber 122 becomes more pronounced to thereby increase the differential between the level of liquid in separator S at which main valve 16 opens and the level of liquids in separator S at which main valve 16 closes. The fixed orifice 121 in line 120 functions to control the rate of flow of gas therethrough so that with bypass valve 128 slightly open, the opening of valve 36 creates a sufficient pressure drop in line 126 to at least partially reduce the pressure in chamber 122. Thus, the relative opening of bypass valve 128 and the size of fixed orifice 121 control the amount of reduction in pressure in chamber 122 and consequently control the opening of pilot valve 36 and main valve 16.

The foregoing description relates to controlling liquid level in a vessel under pressure in which two phases, liquid and gas, are present in the vessel. In the event liquid level is to be controlled in a vessel under atmospheric pressure, the valve of the present invention should be connected to the vessel discharge and when so connected, operates in a manner similar to the operation of the valve structure shown in FIGURE 4 with the liquid being used as the supply fluid conducted from the discharge line to the pilot chamber 56 and the valve chamber 22.

For pressure applications above 15 p.s.i.g., it is generally required that the valve fail-safe, that is, the main valve must open at or below its preselected opening pressure. In such applications, it is preferred to have the outer diameter of the plates 82 close fitting with respect to the interior of spacer ring 81. Then if the diaphragm 80 fails, this close fit restricts blowby sufficiently to cause the structure to act as a piston to provide the power necessary to open the pilot against spring force. If the diaphragm 38 fails, the check plate 99 seats to maintain pressure in the sensing chamber 56. Failure of either the spring or the upper diaphragm 78 reduces the force resisting the force resulting from the pressure in sensing chamber 56 to thereby lower the opening pressure.

Thus, it can be seen that the present invention provides an improved pilot controlled valve with adjustment to vary the control signal to the pilot for operation with snap action and proportioning control. This valve is of rugged construction, has accurate response and can be adapted to function as a pressure relief valve and as a liquid level control valve. As shown and described, the pilot of the present invention has incorporated in its structure the variable restriction which varies the control signal to control the operation of the valve.

What is claimed is:
1. A pilot valve comprising,
a valve body,
said valve body defining a port, an outlet and a valve seat surrounding communication between said port and said outlet,
a valve movably supported with respect to said body and adapted to be seated on and unseated from said valve seat to control flow therethrough,
pressure responsive means connected to said valve and adapted to move said valve,
a first means establishing communication between a pressure fluid whose pressure is to be controlled and said pressure responsive means,
the pressure of fluid conducted to said pressure responsive means through said first means urging said pressure responsive means in a direction to unseat said valve from said valve seat,
means for supplying actuating fluid to said port,
a second means establishing communication between said pressure responsive means and said supply means,
the pressure of actuating fluid conducted to said pressure responsive means through said second means urging said pressure responsive means in a direction to seat said valve on said valve seat,
a restriction in said supply means ahead of said port, and
means for controlling the pressure in said second means whereby flow occurs through said second means on opening of said valve to reduce the pressure urging said pressure responsive means in a direction to seat said valve on said valve seat and to reduce pressure in said port,

2. A pilot valve according to claim 1, including resilient means urging said pressure responsive means in a direction to close said valve.

3. A pilot valve according to claim 2, including means for adjusting the force exerted by said resilient means on said pressure responsive means.

4. A pilot valve according to claim 1, wherein said control means includes,
a variable restriction in said supply means ahead of the connection of said second means into said supply means.

5. A pilot valve according to claim 1, wherein said control means includes,
a variable restriction in said second means.

6. A pilot valve according to claim 1, wherein said pressure responsive means includes,
a diaphragm case supported with respect to said body and having a first diaphragm and a second diaphragm operably mounted therein,
said first diaphragm and said case defining a sensing chamber into which said first means connects,
said first and second diaphragms and said case defining a boost chamber into which said second means connects,
the effective pressure area of said diaphragms exposed to fluid pressure in said boost chamber being less than the effective pressure area of the diaphragm exposed to fluid pressure in said sensing chamber, and
means connecting said diaphragms to said valve whereby movement of said diaphragms responsive to fluid pressure in said chambers moves said valve.

7. A pilot valve according to claim 6, including adjustable spring means operably connected to urge said diaphragms in a direction to seat said valve on said valve seat.

8. A pilot valve comprising,
a valve body,
said valve body defining a port, an outlet and a valve seat surrounding communication between said port and said outlet,
a valve movably supported with respect to said body and adapted to be seated on and unseated from said valve seat to control flow therethrough,
pressure responsive means connected to said valve and adapted to move said valve,
a first means establishing communication between a pressure fluid whose pressure is to be controlled and said pressure responsive means,
the pressure of fluid conducted to said pressure responsive means through said first means urging said pressure responsive means in a direction to open said valve,
means for supplying actuating fluid to said port,
a variable restriction in said supply means,
a second means establishing communication between said pressure responsive means and said supply means at a point between said variable restriction and said port,
the pressure of actuating fluid conducted to said pressure responsive means through said second means urging said pressure responsive means in a direction to close said valve, and
a second restriction in said supply means between said port and said second means whereby on opening of said valve flow occurs through said second means to reduce the pressure urging said pressure responsive means in a direction to close said valve.

9. A valve adapted to control pressure condition in a fluid pressure container comprising,
a main valve connected to a fluid pressure container and having a valve seat in communication with the fluid pressure container and a pressure responsive valve element adapted to move to and from engagement with said valve seat to control flow of fluid through said main valve,
a pilot valve having a valve body defining a port, an outlet and a valve seat surrounding communication between said port and said outlet,
a valve movably supported with respect to said body and adapted to be seated on and unseated from said valve seat to control flow therethrough,
pressure responsive means connected to said valve and adapted to move said valve,
a first means establishing communication between a pressure fluid whose pressure is to be controlled and said pressure responsive means,
the pressure of fluid conducted to said pressure responsive means through said first means urging said pressure responsive means in a direction to unseat said valve from said valve seat,
means for supplying actuating fluid to said port,
a second means establishing communication between said pressure responsive means and said supply means,
the pressure of actuating fluid conducted to said pressure responsive means through said second means urging said pressure responsive means in a direction to seat said valve on said valve seat,
a restriction in said supply means ahead of said port, and
means for controlling the pressure in said second means whereby flow occurs through said second means on opening of said valve to reduce the pressure urging said pressure responsive means in a direction to seat said valve on said valve seat.

10. A pilot controlled vent valve adapted to vent a pressure fluid container to avoid excess pressure in such container, comprising a main valve connected to a fluid pressure container and having a valve seat in communication with the fluid pressure container and a pressure responsive valve element adapted to move to and from engagement with said valve seat to control flow of fluid through said main valve,
a pilot valve having an outlet, a pilot valve seat and a pilot valve element controlling flow through said pilot valve,
a first means establishing communication between said pilot valve and said pressure responsive valve element of said main valve whereby opening of said pilot valve vents fluid pressure from said pressure responsive valve element for opening said main valve,
pressure responsive means connected to said pilot valve element to control the positioning of said pilot valve element,
a second means establishing communication between the pressure fluid container and said pilot valve pressure responsive means whereby pressure fluid from the container urges said pilot valve pressure responsive means in a direction to open said pilot valve,
a third means establishing communication from said second communication establishing means and said pilot valve pressure responsive means whereby pressure fluid from the container urges said pressure responsive means in a direction to close said pilot valve,
a variable flow restriction in said third communication establishing means whereby under flow conditions the fluid pressure delivered to said pilot valve pressure responsive means through said third communication establishing means is less than the fluid pressure delivered to said pilot valve pressure responsive means through said second communication establishing means,
a fourth means establishing communication between said third communication establishing means and said first communication establishing means downstream of said variable restriction and including a flow restriction therein whereby under flow conditions the fluid pressure delivered to said first communication establishing means is less than the individual fluid pressure conducted to said pilot valve pressure responsive means.

11. A pilot actuated liquid level control valve to control the liquid level in a pressure vessel containing liquid and gas under pressure and having an inlet, a gas outlet and a liquid outlet, comprising
a main valve connected to the liquid outlet of said vessel and having a valve seat in communication with said liquid outlet, and a valve element adapted to move to and from engagement with said valve seat to control flow of liquid through said main valve,
a pilot valve having an outlet, a pilot valve seat and a pilot valve element controlling flow through said pilot valve,
a first means establishing communication between said pilot valve and said pressure responsive valve element of said main valve whereby opening of said pilot valve vents fluid pressure from said pressure responsive valve element for opening said main valve,
pressure responsive means connected to said pilot valve element to control positioning of said pilot valve element,
a second means establishing communication between the pressure vessel and said pilot valve pressure responsive means whereby liquid from the vessel urges said pilot valve pressure responsive means in a direction to open said pilot valve,
a third means establishing communication from gas space in the pressure vessel to said pilot valve pressure responsive means whereby gas from said vessel urges said pilot valve pressure responsive means in a direction to close said pilot valve and through a restriction to said first means to supply actuating gas to said pressure responsive valve element of said main valve, bypass means establishing communication between said first means and the connection of said third means to said pilot valve pressure responsive means, and adjustable means controlling flow through said bypass means whereby the responsive means of said pilot valve and said main valve are controlled.

12. A valve according to claim 11, wherein said adjustable means includes, an adjustable valve in said bypass means, said adjustable valve when closed, maintaining full gas pressure from said vessel in said pilot valve pressure responsive means, when slightly opened, bleeds some gas pressure from said pilot valve pressure responsive means on opening of said pilot valve to reduce the additional liquid head necessary for full opening of said pilot valve and when opened a greater degree, rapidly vents gas from said pilot valve pressure responsive means to control the amount of head reduction in said vessel before the main valve closes.

References Cited

UNITED STATES PATENTS

| | | | |
|---|---|---|---|
| 2,504,470 | 4/1950 | Trautman | 137—484.2 X |
| 2,576,516 | 11/1951 | Jurs | 137—491 |
| 2,736,337 | 2/1956 | Parks et al. | 137—403 X |
| 3,211,174 | 10/1965 | Weise et al. | 137—489 X |
| 3,272,227 | 9/1966 | Williams | 137—491 |

WILLIAM F. O'DEA, Primary Examiner

DAVID R. MATTHEWS, Assistant Examiner

U.S. Cl. X.R.

137—209, 415, 489, 492.5